Sept. 27, 1927.  
H. B. SWAN ET AL  
1,643,427  
POPPET VALVE FOR AIR JOLTED MOLDING MACHINES  
Filed Oct. 26, 1921   2 Sheets-Sheet 1
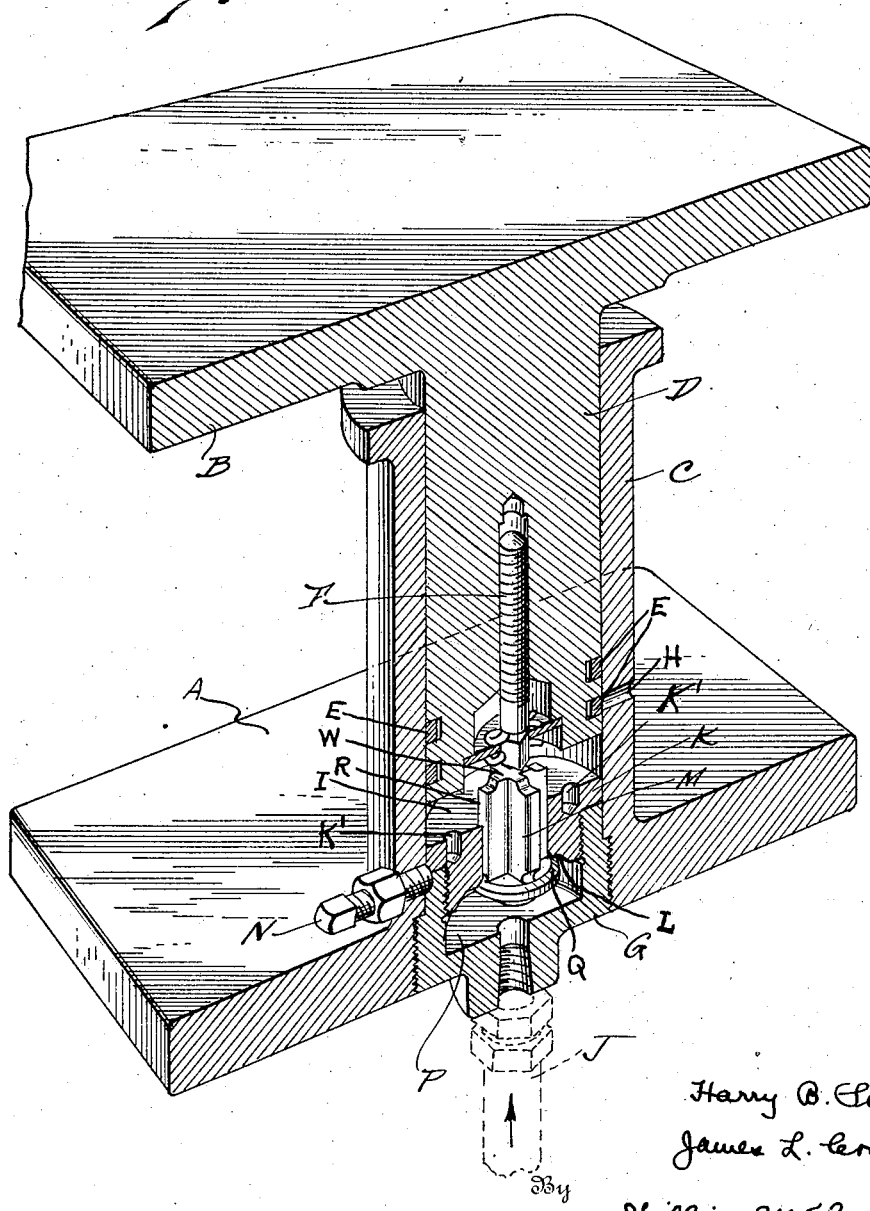

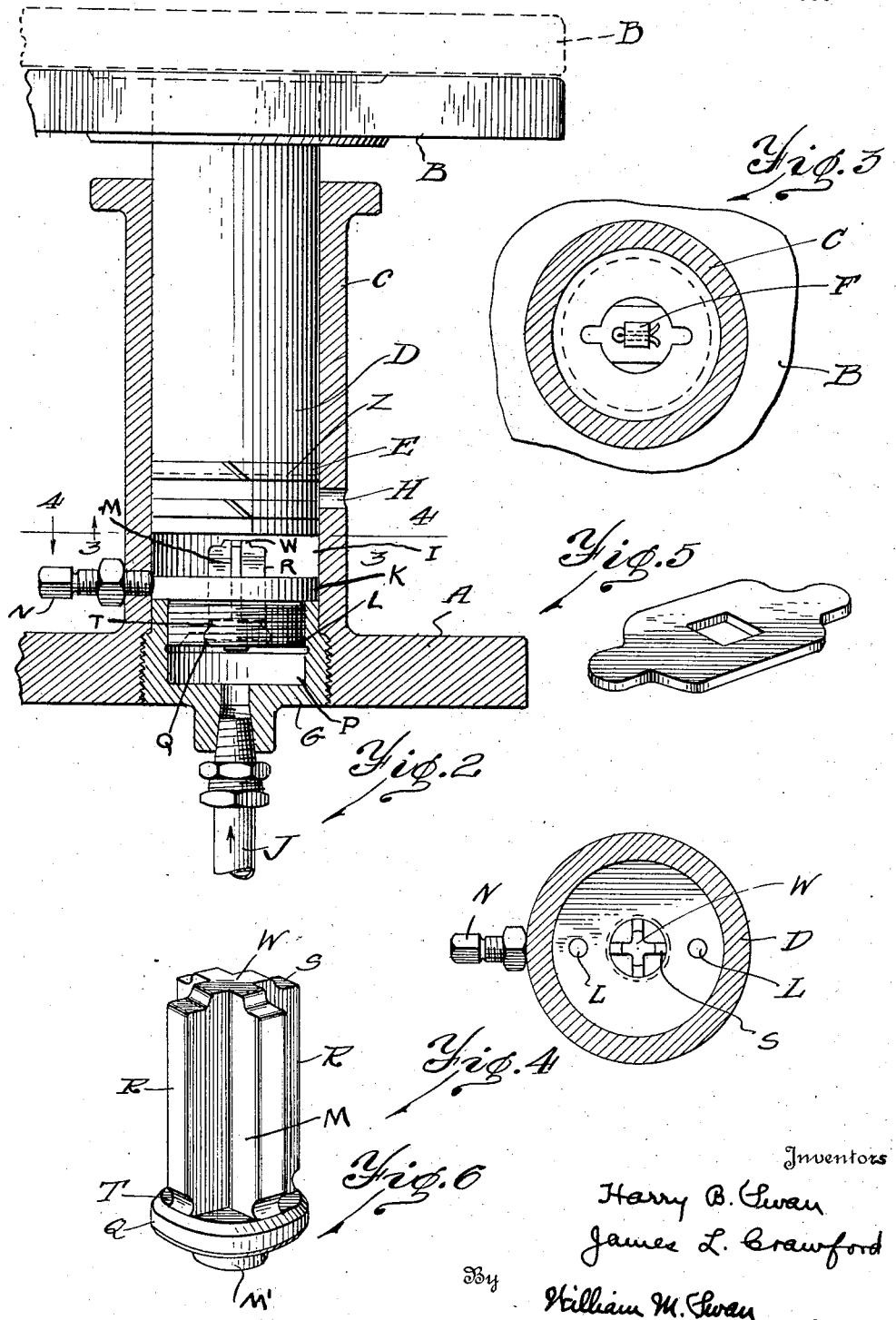

Patented Sept. 27, 1927.

1,643,427

UNITED STATES PATENT OFFICE.

HARRY B. SWAN AND JAMES L. CRAWFORD, OF DETROIT, MICHIGAN.

POPPET VALVE FOR AIR-JOLTED MOLDING MACHINES.

Application filed October 26, 1921. Serial No. 510,642.

This invention relates to poppet valves for air-jolted molding machines, and has for its object an improved organization of parts capable of very rapid closing and opening action, which dispenses entirely with, at best, uncertain and easily disarranged spring mechanisms for effecting the opening and closing movements of the valve members. While especially adapted for the purpose stated, our improved construction is easily adaptable to other more or less analogous uses with other mechanisms, and we desire the scope of this disclosure to be understood accordingly.

In the drawings:

Figure 1 is a perspective of a sectioned half of our improved construction, showing its relation to the adjacent portions of the mechanisms to which it is applied.

Figure 2 is a sectional elevation, bringing out particularly the formation of the component parts of our construction.

Figure 3 is a plan view, partly in section, taken along the line 3—3 of Figure 2, and looking in the direction of the arrows there shown.

Figure 4 is a similar plan view, taken along the same line, in Figure 2 as Figure 3, but looking in the opposite direction, as indicated by the arrows 4—4.

Figure 5 is a detail perspective view of the lock washer employed in connection with the union between the piston stem and the body of the piston.

Figure 6 is a detail perspective view of our preferred form of valve members.

A indicates the base, and B the joltable table of a molding machine, from the former of which rises the containing cylinder C, while from the table, depends the unitary piston piece D, which slidably engages in the cylinder C, the degree of its rise in the cylinder C being regulatable according to the position of the exhaust vent H in the cylinder wall. Within the body of the piston piece D is located an adjustable screw stem F, the degree of whose downward projection toward the top of the valve M determines the point where air pressure is admitted and where cut off takes place. In the lower portion of the cylinder C is located an exhaust vent H, past which the piston rings E are adapted to slide, so that at the upper limit of their travel (indicated approximately by the dotted line Z, shown in Figure 2) the exhaust vent will be open, while in the full line position shown in Figures 1 and 2 the vent will be blanked by the presence of the piston rings over it.

Removably inset through the base A is the screw threaded plug G, whose center portion is bored for connection with the air pipe J. The central portion of this plug G is also hollowed so as to provide a chamber P of relatively great width, compared with the diameter of the air inlet J, and between the base or floor of the chamber P, and the adjacent lower end of the piston D, there is removably inserted, as by screw threading, a closing cap K, provided with wrench sockets K', or similar means, for permitting the rotatable engagement of the cap by an assembling implement, so as to thread the cap sufficiently into the apertured plug G, to make an air tight joint. The meeting recessed portions of the plug G and cap K thus form a valve chamber P, with the depending annular edge of the cap K forming the valve seat L, of complementary contour to the base portion Q of the valve M, which is adapted to seat against it when elevated by the inrush of air through the pipe J. When its desired position has been reached, the further and unintended rotation of the cap K is prevented by the adjustment of the set screw N, or some similar and equivalent member. About the top surface of this cap K and between it and the adjacent and lower surface of the piston D is a further air space I, as brought out particularly in Figures 1 and 2.

Through the apertured center portion of the cap piece K slidably engages the air valve stem M, which, as brought out particularly in Figure 6, has at its base a relatively small striking projection M', immediately above which is a rounded disk portion Q, of appreciably larger diameter than either the part T or of the air inlet pipe J, which, as stated, seats against the depending annular valve seat L. The upper portion of the valve body is preferably of cruciform cross section, each of the branches R being cut away or grooved as at T near its base, and having its upper surface cut away at the tips, as brought out at S, so that the still cruciform extreme top W, of the valve body M, has its arms considerably shorter than the arms R of the main body. The corresponding center portion of the cap K is apertured so as to permit the slidable engagement of the cruciform valve piece therethrough. It is of course obvious that exact adherence to the cruciform contour of the valve body herein illustrated is not indispensable to the satisfactory operation of the mechanism.

When the mechanism is not operating, and no air blast is coming through the pipe J, the valve M rests on the bottom of the air chamber P over the air inlet J, and with the disk portion Q away from the depending valve seat L. The piston D is at the lower limit of its travel, resting on the top of the cap K, and with the piston rings E blanking the exhaust vent H. When air is admitted through the pipe J, over whose upper end the valve M rests only loosely because of the relative size of the striking projection M', the air first passes about the base of the valve M and, because of its cruciform shape, beyond the valve seat L to the upper valve chamber I, thus acting against the bottom of the piston D and raising it until it is above the level of the exhaust vent H. Almost simultaneously therewith, though lagging behind the velocity of the first entering air, the air pressure against the wide base of the valve M forces it upwardly until its disk portion Q seats against the depending annular seat L. With the piston D past the air vent H, the air in the chamber I escapes, the piston D falls, and its adjustable screw F strikes the top W of the valve M and unseats it from the valve seat L, so that it falls to the bottom of the chamber P, after which, so long as air keeps coming in through the pipe J, the cycle of operations just described is repeated; and since this is relatively rapid, the desired upward and downward jolting movement occurs in quick alternation. We have found that in operation the opening of the valve occurs before the piston reaches its lower limit of travel, thus allowing the admittance of full line air pressure to the chamber I, retarding the fall of the piston and the table B before it strikes the top of cylinder C. This eliminates any tendency of a rebounding blow on the cylinder C and gives the positive jolting action desired. The frequency of impulse is controlled by the height of the exhaust vent H in the cylinder wall above the bottom of the cylinder and by varying the length of the projection of the screw stem F. The latter adjustment is made according to the load placed on the piston.

What we claim is:

1. The combination of an upright cylinder provided with a laterally positioned outlet aperture, a weighted piston operating in the cylinder, a plug threaded into the lower end of the cylinder and having an air inlet and cap secured in the plug and having a valve seat and a valve member confined within the plug by the said cap and cooperating with the valve seat and arranged to be engaged and dislodged from its seat by the downward movement of the piston.

2. The combination of an upright cylinder provided with a laterally positioned outlet aperture, a weighted piston operating in the cylinder, a plug threaded into the lower end of the cylinder and having an air inlet and cap secured in the plug and having a valve seat and a valve member confined within the plug by the said cap and cooperating with the valve seat and arranged to be engaged and dislodged from its seat by the downward movement of the piston, and a threaded stem depending from the piston and adjustable to dislodge the valve member from its seat.

In testimony whereof, we sign this specification.

HARRY B. SWAN.
JAMES L. CRAWFORD.